United States Patent
Jones et al.

(10) Patent No.: US 10,436,037 B2
(45) Date of Patent: Oct. 8, 2019

(54) BLADE WITH PARALLEL CORRUGATED SURFACES ON INNER AND OUTER SURFACES

(71) Applicant: General Electric Company, Schenectady, NY (US)

(72) Inventors: Jeffrey Clarence Jones, Simpsonville, SC (US); Thomas James Brunt, Greenville, SC (US); Jason Anton Byers, Greenville, SC (US); Adam John Fredmonski, Simpsonville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 15/217,033

(22) Filed: Jul. 22, 2016

(65) Prior Publication Data

US 2018/0023398 A1    Jan. 25, 2018

(51) Int. Cl.
*F01D 5/14* (2006.01)
*F01D 5/18* (2006.01)

(52) U.S. Cl.
CPC ............ *F01D 5/145* (2013.01); *F01D 5/188* (2013.01); *F01D 5/186* (2013.01);
(Continued)

(58) Field of Classification Search
CPC .......... F01D 5/145; F01D 5/147; F01D 5/186; F01D 5/188; F01D 5/189; F05D 2250/61; F05D 2260/201
(Continued)

(56) References Cited

U.S. PATENT DOCUMENTS 3,650,635 A   3/1972 Wachtell et al.
4,830,315 A   5/1989 Presz, Jr. et al.
(Continued)

FOREIGN PATENT DOCUMENTS

JP    63-195302    8/1988
JP    07-332007    12/1995
WO    2015/191041   12/2015

OTHER PUBLICATIONS

Denton "The Trailing Edge Loss of Transonic Turbine Blades" Journal of Turbomachinery, Apr. 1990, vol. 112 pp. 277-285.
(Continued)

*Primary Examiner* — Ninh H. Nguyen
*Assistant Examiner* — Maxime M Adjagbe
(74) *Attorney, Agent, or Firm* — Dale Davis; Hoffman Warnick LLC

(57) ABSTRACT

A blade includes an airfoil body defined by a concave pressure side outer wall and a convex suction side outer wall that connect along leading and trailing edges and, therebetween, form a radially extending chamber for receiving the flow of a coolant. The airfoil body has an inner surface facing the radially extending chamber and an outer surface, a first corrugated surface on a portion of the outer surface, and a second corrugated surface on the inner surface paralleling the first corrugated surface. The corrugated surface on the outer surface of the airfoil provides wake mixing. The blade may also include an integrally formed impingement cooling structure having a third corrugated surface parallel to the second corrugated surface, which is made possible through additive manufacturing. The impingement cooling structure so formed provides improved cooling of the blade.

20 Claims, 16 Drawing Sheets

(52) U.S. Cl.
CPC .... *F05D 2220/30* (2013.01); *F05D 2240/303* (2013.01); *F05D 2240/304* (2013.01); *F05D 2250/61* (2013.01); *F05D 2250/711* (2013.01); *F05D 2250/712* (2013.01); *F05D 2260/201* (2013.01); *Y02T 50/673* (2013.01); *Y02T 50/676* (2013.01)

(58) Field of Classification Search
IPC .......... F01D 5/145, 5/147, 5/186, 5/188, 5/189; F05D 2250/61, 2260/201
See application file for complete search history.

(56) References Cited

U.S. PATENT DOCUMENTS

| | | | |
|---|---|---|---|
| 5,704,763 | A | 1/1998 | Lee |
| 6,092,766 | A | 7/2000 | LaRoche et al. |
| 6,508,000 | B2 | 1/2003 | Burke et al. |
| 6,733,240 | B2 | 5/2004 | Gliebe |
| 7,156,619 | B2 | 1/2007 | Papple |
| 7,303,376 | B2 | 12/2007 | Liang |
| 7,377,746 | B2 | 5/2008 | Brassfield et al. |
| 7,736,123 | B2 | 6/2010 | Lee et al. |
| 7,871,246 | B2 * | 1/2011 | Liang ............... F01D 5/187 416/97 R |
| 7,972,115 | B2 * | 7/2011 | Potier ............... F01D 5/20 416/228 |
| 8,414,263 | B1 | 4/2013 | Liang |
| 8,419,372 | B2 | 4/2013 | Wood et al. |
| 8,506,836 | B2 | 8/2013 | Szuromi et al. |
| 8,573,541 | B2 | 11/2013 | Sullivan et al. |
| 8,608,429 | B2 | 12/2013 | Gupta et al. |
| 8,814,529 | B2 | 8/2014 | Fiala et al. |
| 8,910,361 | B2 | 12/2014 | Rickenbacher et al. |
| 8,944,774 | B2 | 2/2015 | Bielek |
| 9,062,554 | B2 | 6/2015 | Bielek |
| 9,121,294 | B2 | 9/2015 | Kray et al. |
| 9,249,666 | B2 | 2/2016 | Wood et al. |
| 9,267,383 | B2 | 2/2016 | Batt et al. |
| 2012/0216542 | A1 | 8/2012 | Siden et al. |
| 2013/0156549 | A1 | 6/2013 | Maldonado |
| 2013/0291548 | A1 | 11/2013 | Ingram et al. |
| 2014/0301860 | A1 | 10/2014 | Ramm et al. |
| 2015/0086408 | A1 | 3/2015 | Kottilingam et al. |
| 2015/0114003 | A1 | 4/2015 | McMahan et al. |
| 2015/0147164 | A1 | 5/2015 | Cui et al. |
| 2015/0147585 | A1 * | 5/2015 | Schwarze ............. B22F 3/1055 428/546 |
| 2015/0167979 | A1 | 6/2015 | Siden et al. |
| 2015/0184519 | A1 | 7/2015 | Foster et al. |
| 2015/0184537 | A1 | 7/2015 | Smith |
| 2015/0198050 | A1 * | 7/2015 | Lee ...................... F01D 5/188 415/115 |
| 2016/0069185 | A1 | 3/2016 | Stankowski et al. |
| 2017/0159442 | A1 | 6/2017 | Velasquez, Jr. et al. |

OTHER PUBLICATIONS

Pallos "Gas Turbine Repair Technology" GER-3957B (Apr. 2001) 30 pages.
U.S. Appl. No. 15/217,062, Office Action dated Jan. 17, 2019, 23 pages.
U.S. Appl. No. 15/217,012, Office Action dated Jan. 25, 2019, 17 pages.
U.S. Appl. No. 15/217,041, Office Action dated Jan. 30, 2019, 24 pages.
U.S. Appl. No. 15/217,053, Office Action dated Feb. 4, 2019, 25 pages.
U.S. Appl. No. 15/217,062, Final Office Action dated Apr. 18, 2019, 30 pages.
U.S. Appl. No. 15/217,041, Notice of Allownace dated Jun. 3, 2019, 10 pgs.
U.S. Appl. No. 15/217,053, Final Office Action dated Jul. 5, 2019, 32 pages.
U.S. Appl. No. 15/217,062, Notice of Allowance dated Jul. 9, 2019, 6 pages.

* cited by examiner

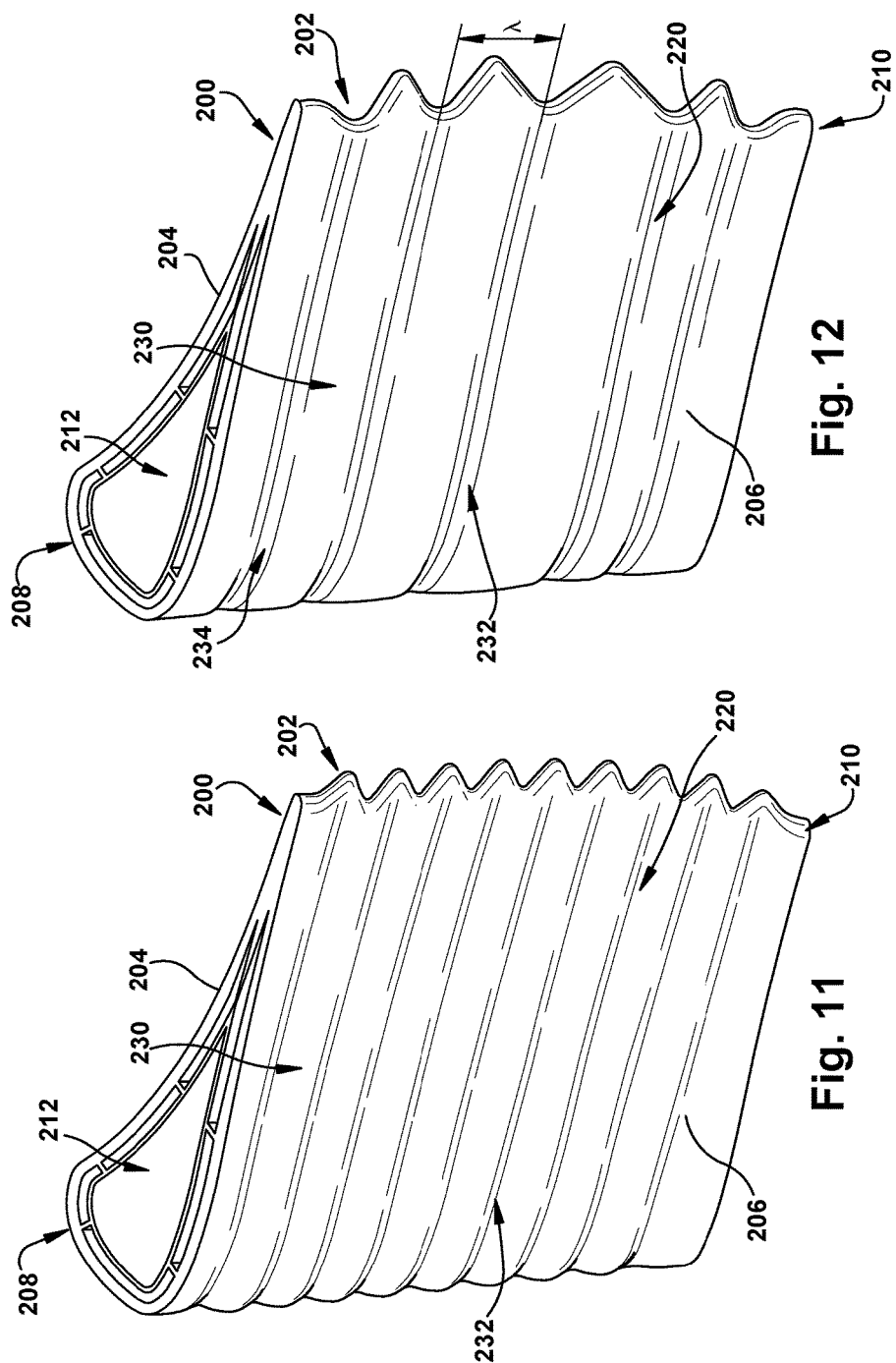

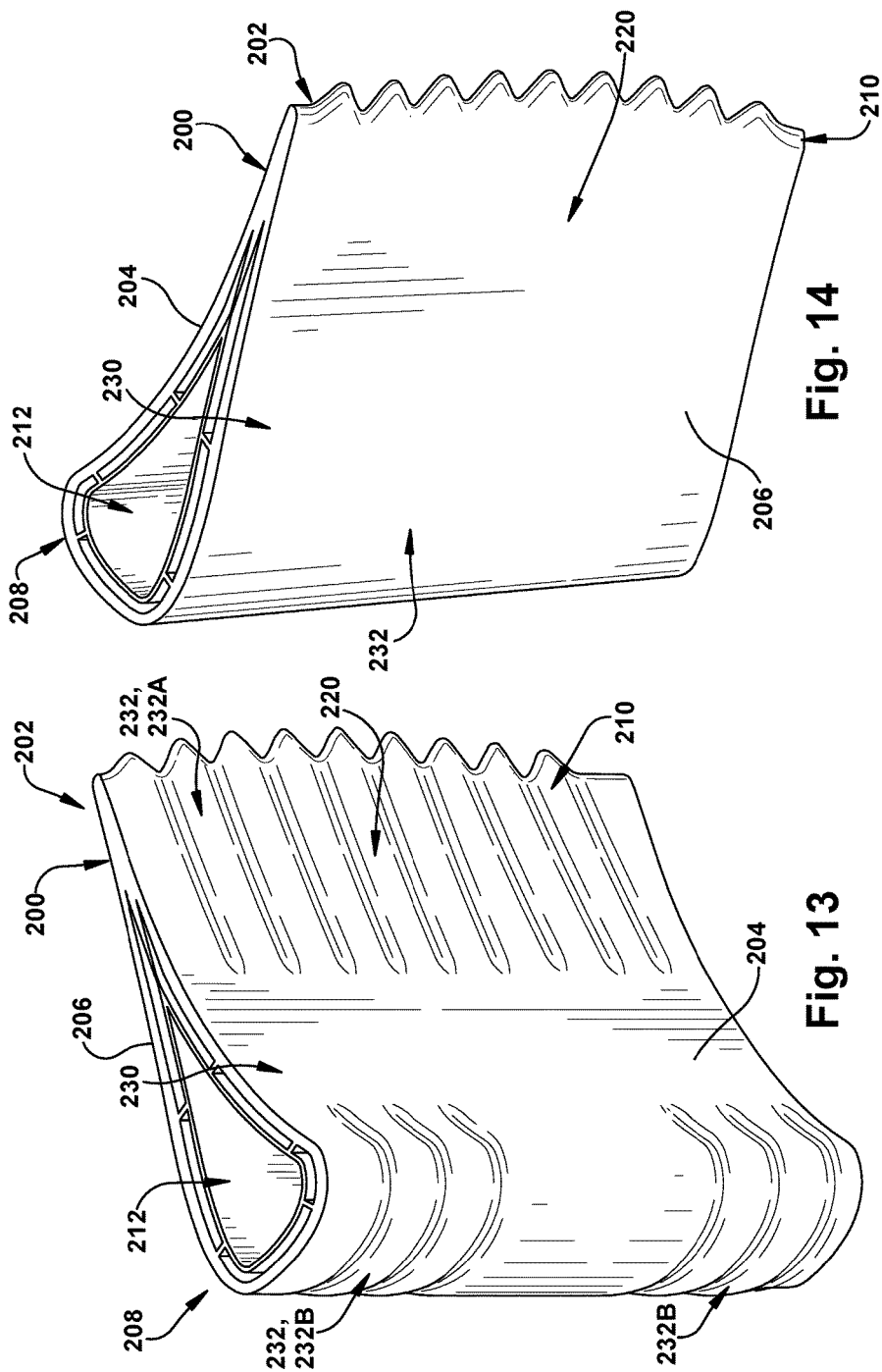

BLADE WITH PARALLEL CORRUGATED SURFACES ON INNER AND OUTER SURFACES

BACKGROUND OF THE INVENTION

The disclosure relates generally to turbomachine blades, and more particularly, to a blade having parallel corrugated surfaces on an outer surface, an inner surface and, where provided, on an impingement cooling structure. The structure is made possible by use of additive manufacturing.

Turbomachine blades include airfoils that accelerate flow through contraction of area and the introduction of tangential velocity. The relative flow velocity exiting, for example, a gas turbine airfoil is quite high, typically with Mach numbers of 0.5 or higher. The finite thickness of an airfoil trailing edge, however, creates a velocity deficit, i.e., a wake, which introduces losses in the flow through viscous mixing. FIG. 1 shows an example of a typical unsteady loss process for a turbine blade row 10 operating behind a turbine vane row 12. At location 14, a wake is generated by a finite trailing edge thickness of the airfoil of vane row 12, resulting in aerodynamic losses due to mixing of the wake with the mainstream. At location 16, the wake interacts with potential field of a downstream airfoil of blade row 10, and it begins to distort. At location 18, the wake is segregated into discrete packages by the leading edge of airfoils in blade row 10. At location 20, a pressure gradient in the airfoil passage (between blades of blade row 10) causes wake packets to stretch and migrate, causing aerodynamic losses due to mixing of the wake packets (referred to as "free stream mixing"). That is, when the wake is ingested into a downstream airfoil of blade row 10, the wake undergoes a stretching and dilation process that exacerbates the losses associated with the mixing. At location 22, the wake packets interact with the boundary layer of the blades in blade row 10 downstream of the airfoils' wake, causing higher aerodynamic losses (airfoil surface losses). Unsteady loss caused by this phenomenon is present in all turbomachinery in various forms.

In order to address the above challenges, blades having airfoils with enhanced wake mixing structures have been proposed. The wave mixing structures can take a variety of forms such as crenulated or serrated trailing edges on the airfoils. These structures, however, are limited in their applicability because they must be formed or machined into the airfoil surface, which is a difficult and expensive process. Consequently, an area of the airfoil in which such structures are applied is oftentimes very limited.

BRIEF DESCRIPTION OF THE INVENTION

A first aspect of the disclosure includes a blade including: an airfoil body defined by a concave pressure side outer wall and a convex suction side outer wall that connect along leading and trailing edges and, therebetween, form a radially extending chamber for receiving the flow of a coolant, the airfoil body having an outer surface and an inner surface facing the radially extending chamber; a first corrugated surface on a portion of the outer surface; a second corrugated surface on the inner surface paralleling the first corrugated surface; and an impingement cooling structure positioned within the radially extending chamber, the impingement cooling structure including a portion of an outer surface thereof having a third corrugated surface paralleling the second corrugated surface on the inner surface of the airfoil body.

A second aspect of the disclosure provides a blade including: an airfoil body defined by a concave pressure side outer wall and a convex suction side outer wall that connect along leading and trailing edges and, therebetween, form a radially extending chamber, the airfoil body having an inner surface facing the radially extending chamber and an outer surface; a first corrugated surface on a portion of the outer surface; a second corrugated surface on the inner surface paralleling the first corrugated surface; and an impingement cooling structure positioned within the radially extending chamber, the impingement cooling structure including an outer surface substantially paralleling the inner surface of the airfoil body.

A third aspect of the disclosure provides a non-transitory computer readable storage medium storing code representative of a blade, the blade physically generated upon execution of the code by a computerized additive manufacturing system, the code including: code representing the blade, the blade including: an airfoil body defined by a concave pressure side outer wall and a convex suction side outer wall that connect along leading and trailing edges and, therebetween, form a radially extending chamber for receiving the flow of a coolant, the airfoil body having an outer surface and an inner surface facing the radially extending chamber; a first corrugated surface on a portion of the outer surface; and a second corrugated surface on the inner surface paralleling the first corrugated surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 11-14 show perspective views of alternative embodiments of a blade according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
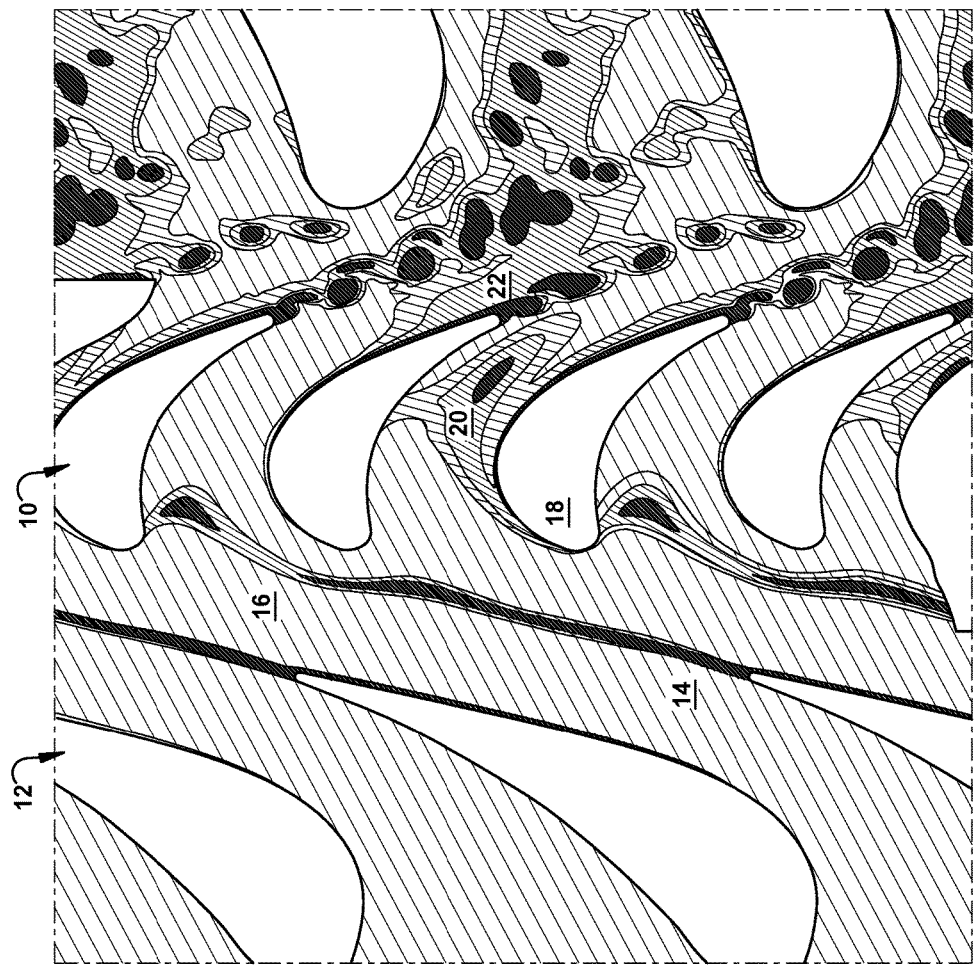
FIG. 1 shows a schematic view of conventional aerodynamic flow within a turbomachine.

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbomachine.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

Figure 2:
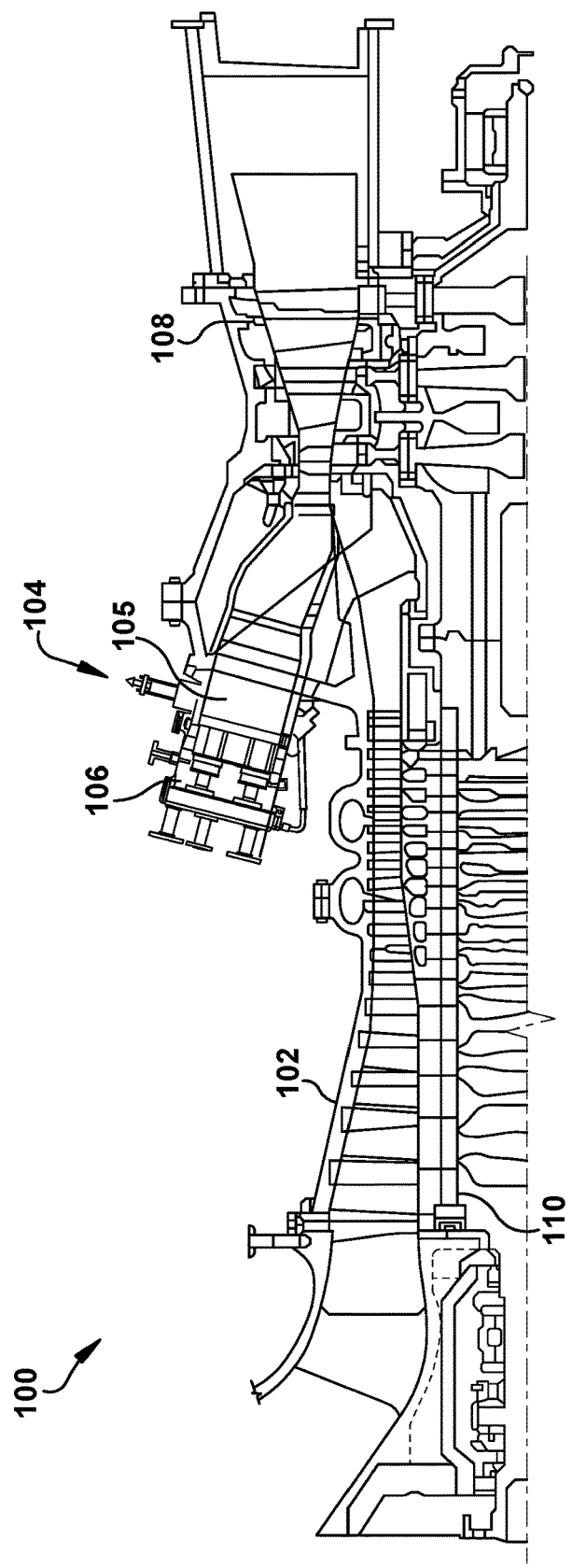
FIG. 2 shows a schematic view of an illustrative turbomachine in the form of a gas turbine system.

FIG. 2 shows a schematic illustration of an illustrative turbomachine 100 in the form of a combustion or gas turbine system. Turbomachine 100 includes a compressor 102 and a combustor 104. Combustor 104 includes a combustion region 105 and a fuel nozzle assembly 106. Turbomachine 100 also includes a turbine 108 and a common compressor/turbine shaft 110 (sometimes referred to as rotor 110). In one embodiment, the combustion turbine system is a MS9001FB engine, sometimes referred to as a 9FB engine, commercially available from General Electric Company, Greenville, S.C. The present disclosure is not limited to any one particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 2) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106.

Figure 3:
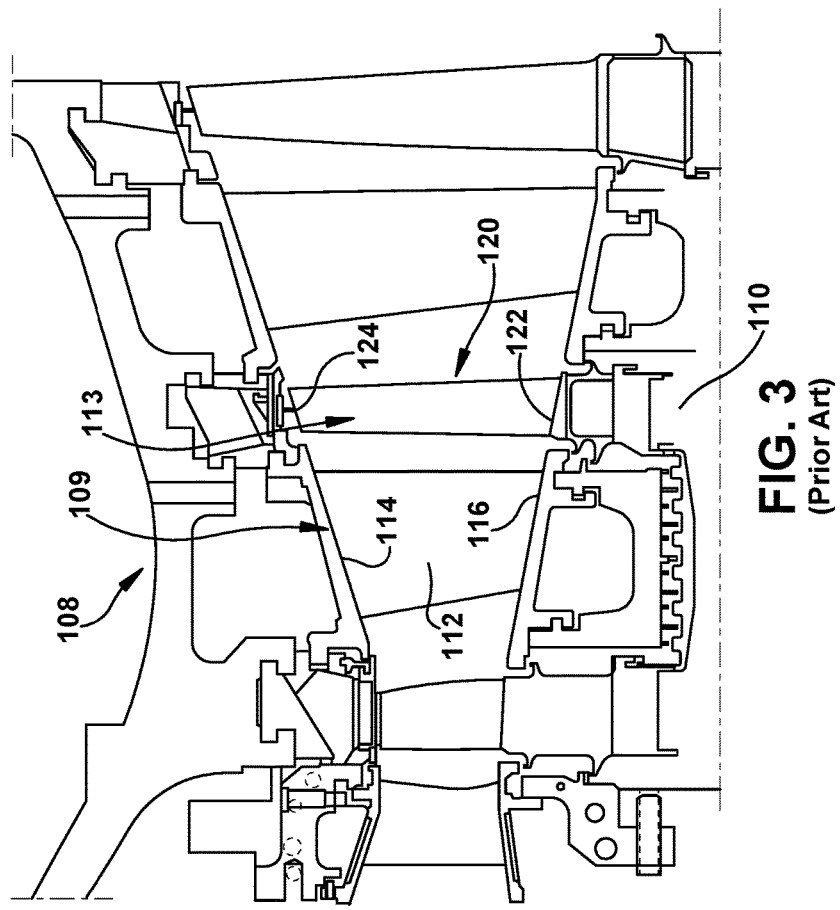
FIG. 3 shows a cross-sectional view of an illustrative gas turbine assembly with a three stage nozzle that may be used with the gas turbine system in FIG. 2.

FIG. 3 shows a cross-sectional view of an illustrative turbine assembly 108 of turbomachine 100 (FIG. 2) with a three stage nozzle that may be used with the gas turbine system in FIG. 2. Turbine assembly 108 includes a row of blades 109 coupled to a stationary casing of turbomachine 100 and axially adjacent another row of blades 113. Here, row of blades 109 includes stationary blades or vanes 112. A vane 112 may be held in turbine assembly 108 by a radially outer platform 114 and a radially inner platform 116. Row of blades 113 in turbine assembly 108 includes rotating blades 120 coupled to rotor 110 and rotating with the rotor. Rotating blades 120 may include a radially inward platform 122 (at root of blade) coupled to rotor 110 and a radially outward tip 124 (at tip of blade). As used herein, the term "blade" shall refer collectively to stationary vanes or blades 112 and rotating blades 120, unless otherwise stated.

Figure 4A:
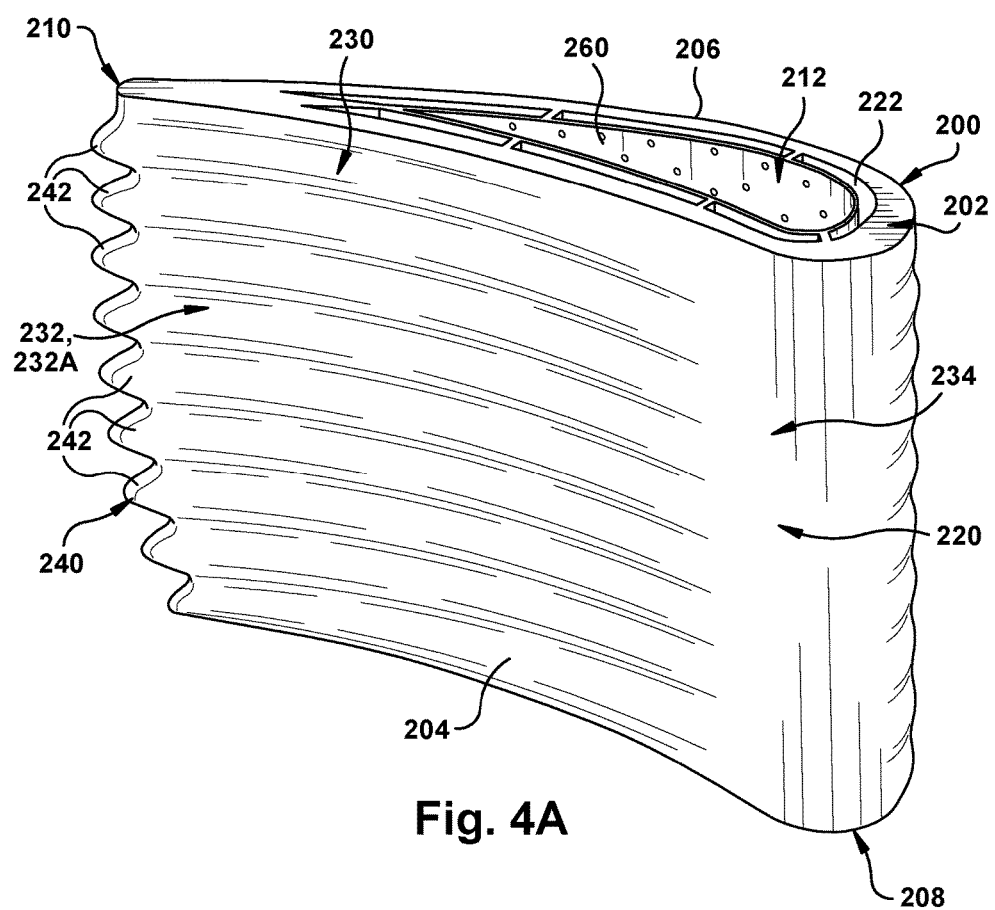
FIGS. 4A and 4B show partially cross-sectioned, perspective views of a blade according to embodiments of the disclosure.
Figure 4B:
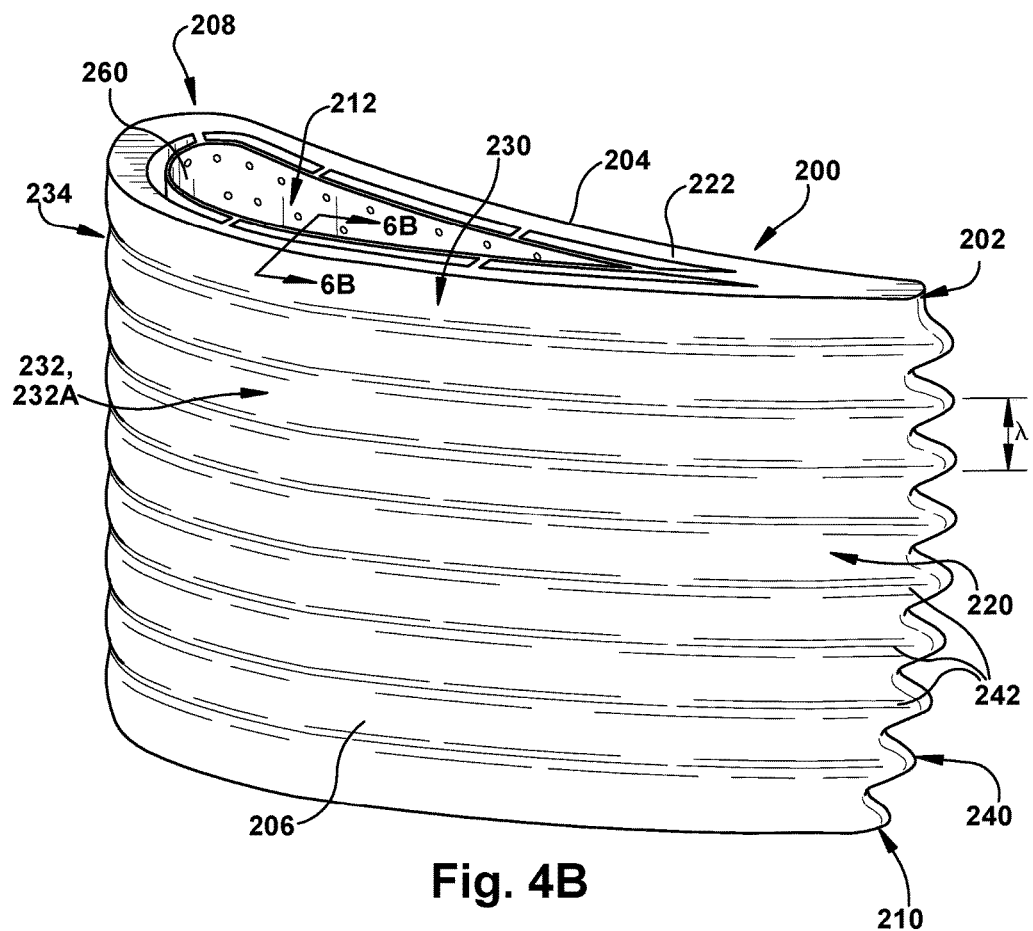

As illustrated in a partially cross-sectional, perspective view of FIGS. 4A-B, in one embodiment the disclosure provides a blade 200 for turbomachine 100 (FIG. 2) including an airfoil body 202 defined by a concave pressure side outer wall 204 and a convex suction side outer wall 206. Outer walls 204, 206 connect along a leading edge 208 and a trailing edge 210 and, therebetween, form a radially extending chamber 212 for receiving the flow of a coolant. Airfoil body 202 thus has an outer surface 220 (including outer surfaces of outer wall(s) 204, 206) and an inner surface 222 facing radially extending chamber 212.

In contrast to conventional blades, blade 200 includes a first corrugated surface 230 on a portion 232 of outer surface 220. "Corrugated surfaces" as used herein may take any form having alternating ridges and grooves. In the embodiment of FIGS. 4A-B, first corrugated surface 230 extends from trailing edge 210 towards leading edge 208 on both concave pressure side outer wall 204 and convex suction side outer wall 206. In one embodiment, first corrugated surface 230 eventually fades to a smooth surface 234 just aft of leading edge 208. In this embodiment, trailing edge 210 also includes a crenulated or serrated edge 240 (hereafter "crenulated trailing edge 240") including a plurality of chevrons 242. "Chevrons" 242, as used herein, are defined as triangular serration planform changes that are employed along a portion of trailing edge 210. While crenulated trailing edge 240 has been illustrated in the form of a serrated edge having a number of spaced chevrons, the edge may include any form of serration, notches, projections, scallops, etc.

Figure 5:
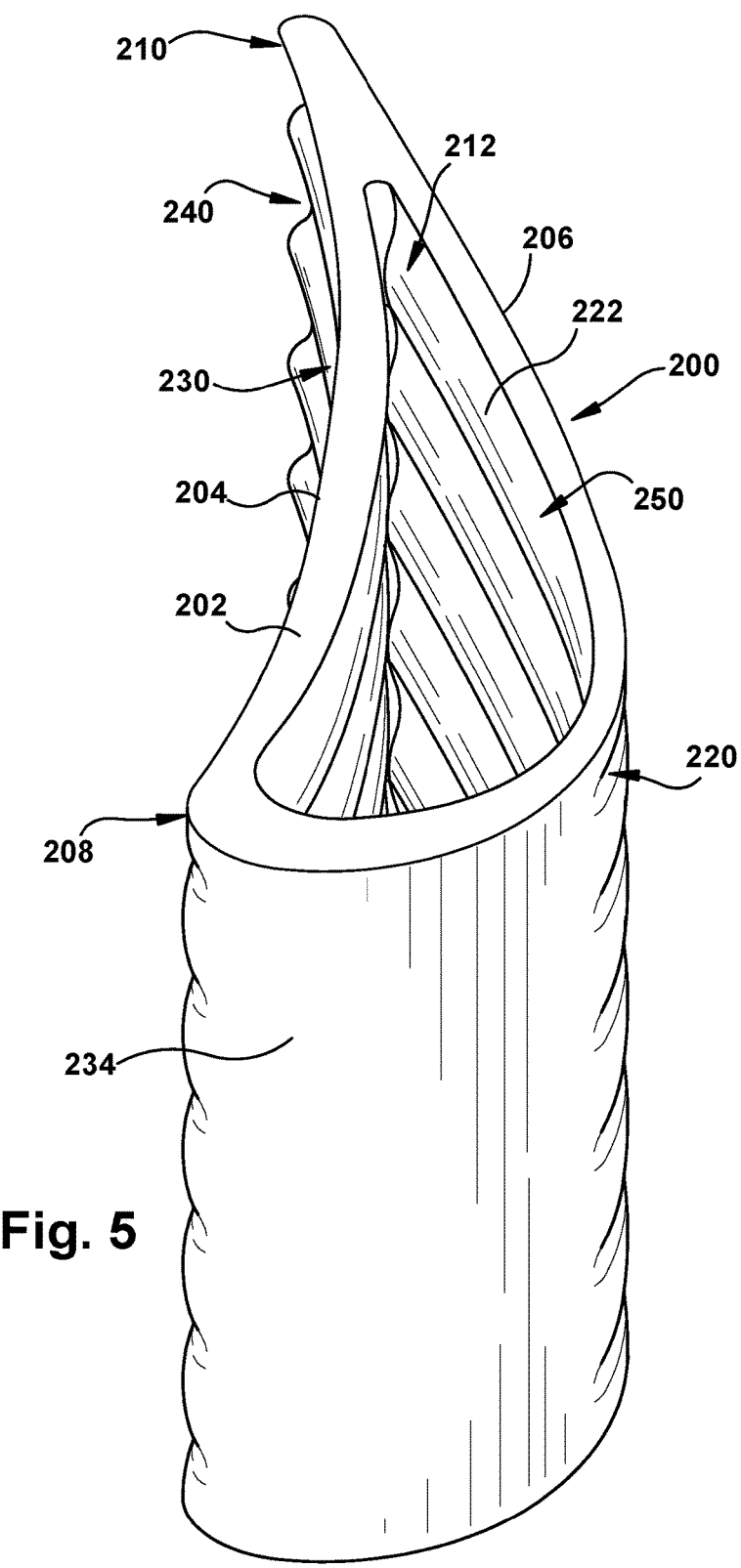
FIG. 5 shows a cross-sectional view of a blade according to another embodiment of the disclosure.
Figure 6A:
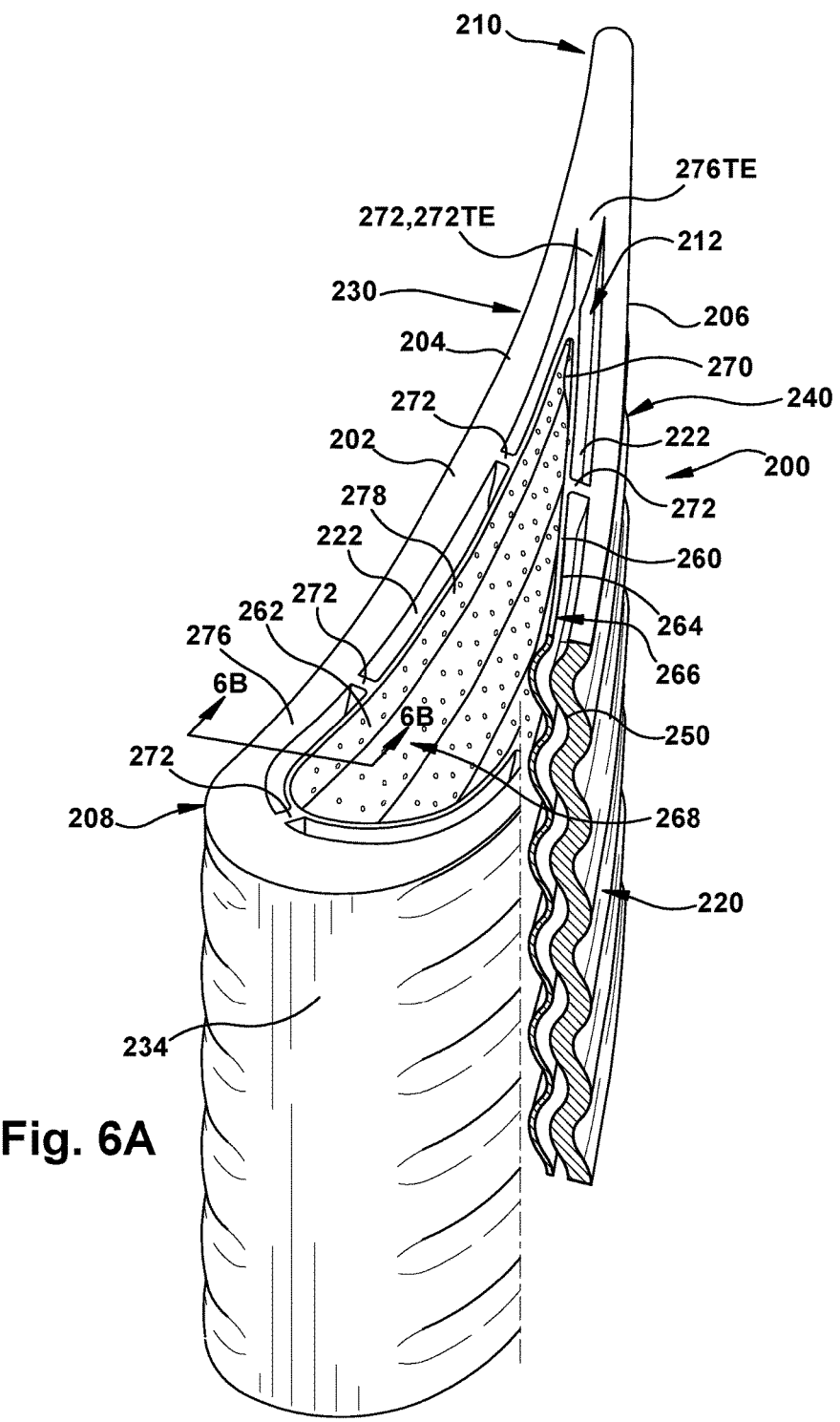
FIG. 6A shows an enlarged perspective view of the blade of FIGS. 4A-B according to embodiments of the disclosure.
Figure 6B:
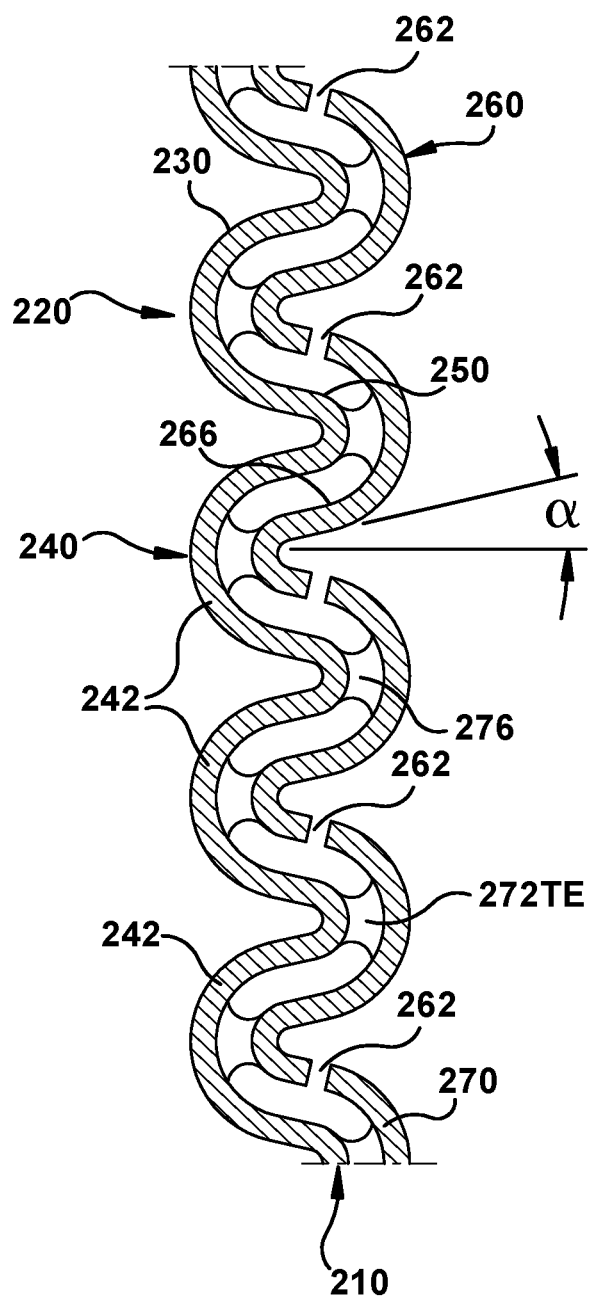
FIG. 6B shows a cross-sectional view of walls of the blade along line 6B-6B in FIG. 4B.

As shown best in cross-sectional views in FIGS. 6A and 6B, blade 200 also includes a second corrugated surface 250 on inner surface 222. FIG. 5 also shows second corrugated surface 250, but without impingement cooling structure 260, described herein. Second corrugated surface 250 may parallel first corrugated surface 230. That is, wherever first corrugated surface 230 exists on outer surface 220, second corrugate surface 250 exists on inner surface 222. Further, where first corrugated surface 230 extends outwardly, e.g., relative to radial passage 212, second corrugated surface 250 also extends outwardly, maintaining a thickness of outer walls 204, 206. Some variance in the parallelism may be possible in, for example, transition areas between adjacent structures. Further, the parallelism described herein is understood to be that possible within now known or later developed additive manufacturing tolerances.

Figure 7:
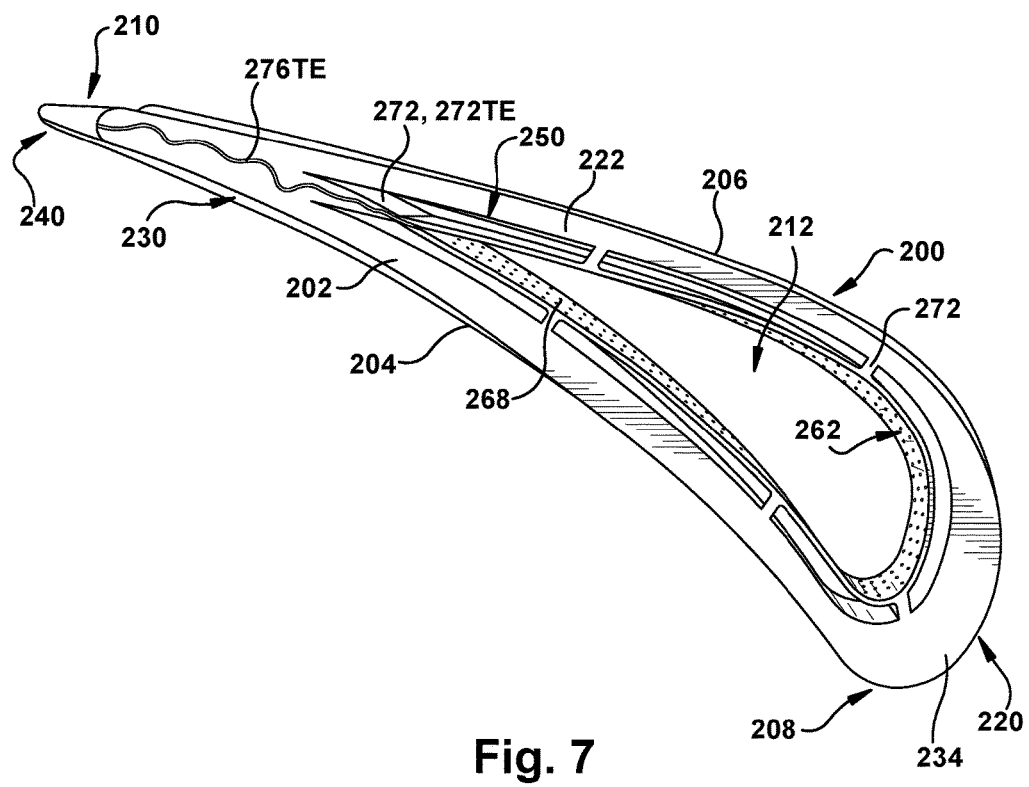
FIG. 7 shows a cross-sectional view of the blade of FIGS. 4A-B according to embodiments of the disclosure.

FIG. 6A shows an enlarged perspective view, and FIG. 7 shows another cross-sectional view of airfoil 200. FIG. 6B shows a cross-sectional view along line 6B-6B in FIG. 4B. FIGS. 4A, 4B, 6A, 6B and 7 show an impingement cooling structure 260 positioned within radially extending chamber 212. As understood in the field, impingement cooling structure 260 extends along radially extending chamber 212 forming another passage therein, and includes a plurality of openings 262 (only a couple labeled in FIGS. 6A and 6B) therein allowing coolant passing through radially extending chamber 212 to exit through the openings to cool inner surface 222 of airfoil body 202. Impingement cooling structure 260 is structured with airfoil body 202 and surrounding structure, e.g., a platform, root, tip shroud, etc., so as to allow coolant flow from one end of airfoil body 202 through radially extending chamber 212. Impingement cooling structure 260 may take the form of any now known or later developed structure providing the impingement cooling, e.g., a sleeve or other passage having openings 262 therein. In any event, in accordance with embodiments of the disclosure, impingement cooling structure 260 also includes at least a portion of an outer surface 264 (FIG. 6A) thereof having a third corrugated surface 266 (FIG. 6A) paralleling second corrugated surface 250 on inner surface 222 of airfoil body 202. That is, corrugated surface 266 follows the contours of corrugated surface 250 in such a way that spacing between the two surfaces is substantially maintained. As noted herein, some variance in the parallelism may be possible in, for example, transition areas between adjacent structures. Further, the parallelism described herein is understood to be that possible within now known or later developed additive manufacturing tolerances. An inner surface 268 of impingement cooling structure 260 may also have a corrugated surface 270 paralleling third corrugated surface 266, so as to maintain a thickness of impingement cooling structure 260 along a length thereof.

Figure 8:
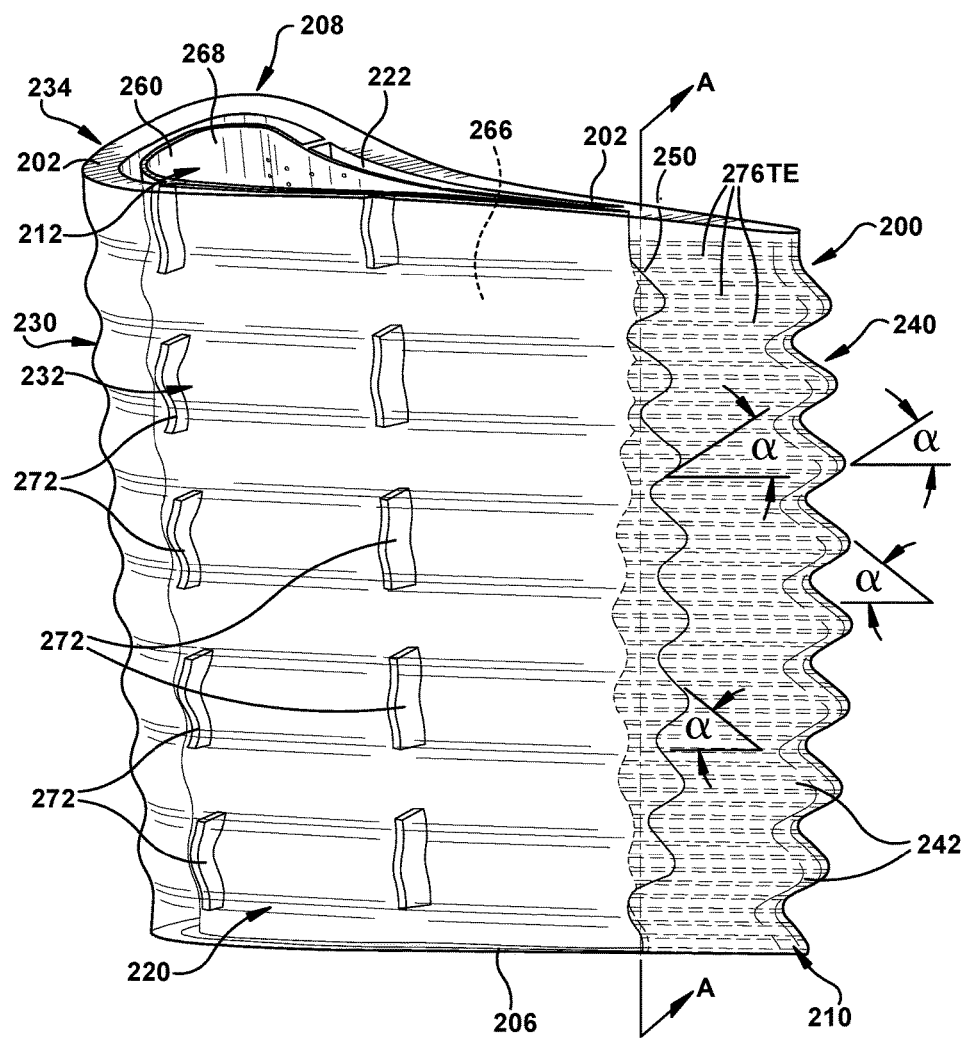
FIG. 8 shows partially cross-sectioned, see-through, perspective view of a blade according to embodiments of the disclosure.

As shown in FIGS. 6A, 6B and 7, and the see-through perspective view shown in FIG. 8, airfoil 200 may also include a plurality of internal supports 272 positioning impingement cooling structure 260 relative to radially extending chamber 212, i.e., relative to inner surface 222 of airfoil body 202. Internal supports 272, as shown best in FIG. 8, may be shaped to complement the corrugated surfaces to which they attach, e.g., second corrugated surface 250 (FIG. 7) and third corrugated surface 266 (FIG. 7). Any number of internal supports 272 necessary to position impingement cooling structure 260 may be employed. While shown as short spaced, thin segments, internal supports 272 can take a variety of longer, shorter, wider or narrower segments, or sub-segments.

Figure 9:
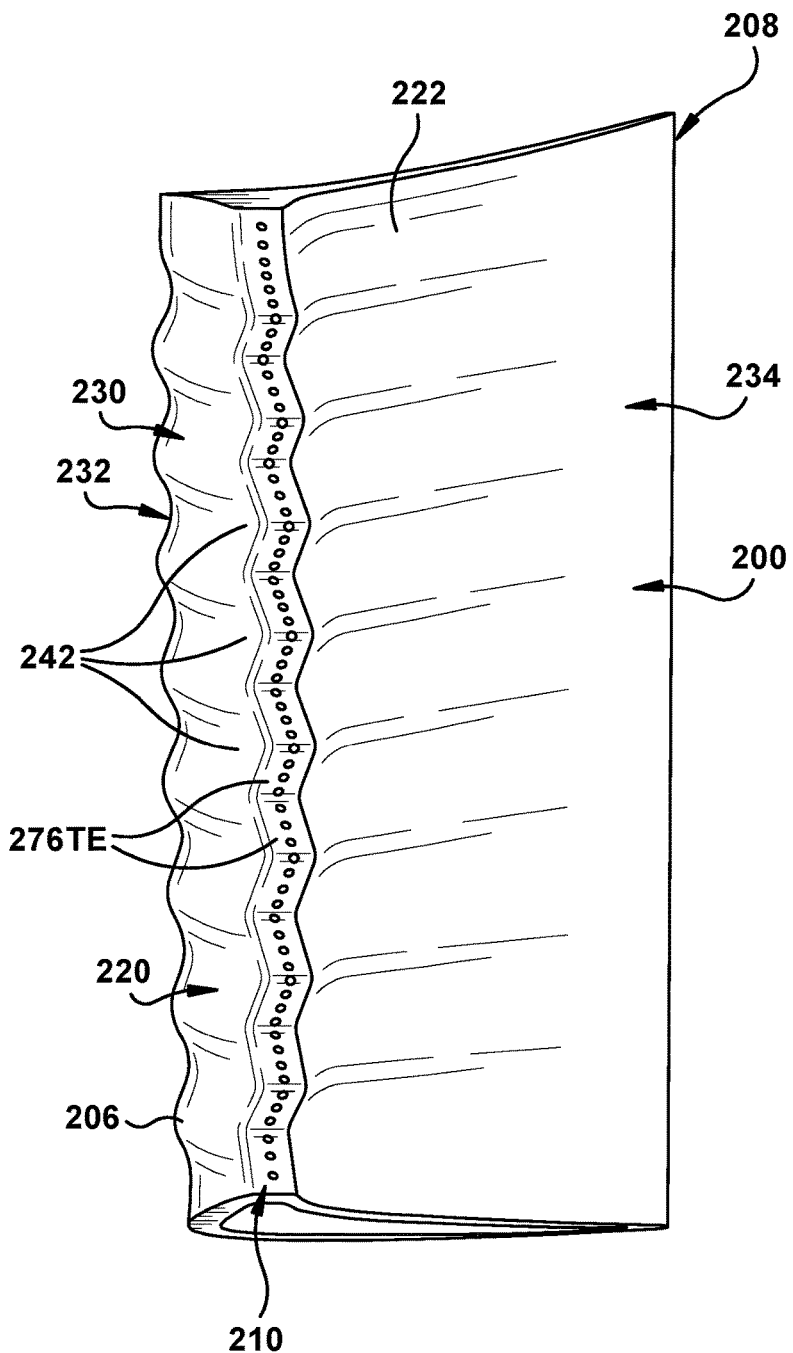
FIG. 9 shows a trailing edge end view of a crenulated trailing edge of a blade according to embodiments of the disclosure.

As shown in FIGS. 6A, 7 and 8, a passage 276 may extend from an inner surface 268 of impingement cooling structure 260 through at least one of the plurality of internal supports 272 and airfoil 202 body to outer surface 220 (e.g., an outside) of airfoil body 202. While passages 276 may be positioned in any internal support 272, at least one of the plurality of internal supports 272TE may couple trailing edge 210 of airfoil body 210 to impingement cooling structure 260. That is, internal support 272TE connects an aft end of impingement cooling structure 260 to an aft end of radially extending chamber 212. Here, a passage 276TE may extend through internal support 272TE from inside impingement cooling structure 260 to outer surface 220 of airfoil body 202 at trailing edge 210 so coolant can pass from inside impingement cooling structure 260 through trailing edge 210. FIG. 8 and the perspective view of trailing edge 210 in FIG. 9 show how a large number of passages 276TE may extend into and through trailing edge 210 to assist in cooling trailing edge 210. Any number of passages 276TE may be radially spaced within a respective internal support 272. While passages 276TE are shown extending through trailing edge 210, alternate embodiments may include at least some passages extending through outer walls 204, 206.

Figure 10:
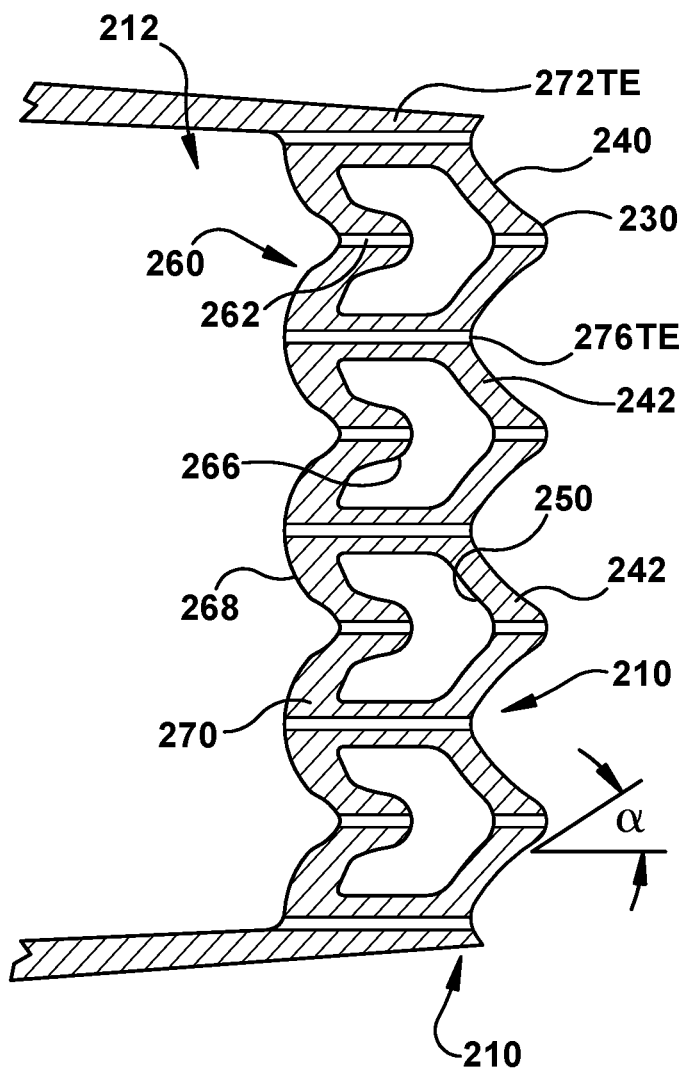
FIG. 10 shows a cross-sectional view of the blade of FIG. 8 along line A-A and showing an alternative embodiment according to the disclosure.

FIG. 8 also shows an arrangement of crenulated trailing edge 240 of trailing edge 210 and impingement cooling structure 260 in which each parallel one another. FIG. 10 shows a partial cross-sectional view along line A-A of FIG. 8 illustrating an alternative arrangement of crenulated trailing edge 240 of trailing edge 210 and impingement cooling structure 260. In the FIG. 10 embodiment, impingement cooling structure 260 extends farther aft and is in closer relation to trailing edge 210 than in FIGS. 6A-8. In any event, as illustrated, crenulated trailing edge 240 (first corrugated surface 230) may parallel second corrugated surface 250, and impingement cooling structure 260 may have third corrugated surface 266 paralleling second corrugate surface 250. In this fashion, coolant delivered via impingement cooling structure 260 can be very precisely delivered to crenulated trailing edge 240 along its length. FIG. 10 also shows internal supports 272TE positioning impingement cooling structure 260 relative to trailing edge 210, and passages 276TE passing through one or more of internal supports 272TE to deliver coolant from inside impingement cooling structure 260 to outer surface 220 of the airfoil body.

With further reference to FIGS. 8 and 10, crenulated trailing edge 240 is shown has having angles α relative to horizontal, and corrugated surface 250, 266 as a representative for all corrugated surfaces 230, 270, etc., are shown as having an angle α. In accordance with embodiments of the disclosure, angle α is no greater than 45°. That is, each corrugated surface 230, 250, 266, 270, etc., and crenulated trailing edge 240, include surfaces extending at no greater than 45° relative to horizontal. As will be appreciated, such angling is a current limitation of now known additive manufacturing techniques.

Referring to FIGS. 11-14, the extent to which corrugated surface 230 covers outer surface 220 of airfoil body 202, i.e., the extent of portion 232 on outer surface 220, may take a variety of alternative forms. As described relative to FIGS. 4A-B, portion 232 of outer surface 220 of airfoil body 202 may include a first section 232A that extends only partially along at least one of concave pressure side outer wall 204 and convex suction side outer wall 206 from trailing edge 210 towards leading edge 208, resulting in a smooth surface 234 near leading edge 208. Alternatively, as shown in FIG. 11, portion 232 may extend along at least one of concave pressure side outer wall 204 and convex suction side outer wall 206 from trailing edge 210 to leading edge 208, i.e., contiguously. In any event, portion 232 of outer surface 220 of airfoil body 202 includes trailing edge 210. That is, corrugate surface 230 extends to or across trailing edge 210. Referring to FIG. 13, in another embodiment, portion 232 of outer surface 220 of airfoil body 202 may further include a second section 232B extending from leading edge 208 partially towards trailing edge 210, and a third section 232C, radially spaced from second section 232B, extending from leading edge 208 partially towards trailing edge 232C. In the embodiment shown, second section 232B and third section 232C would be adjacent inner and outer platforms (116, 114 or 122 (FIG. 3) or tip shroud 124 (FIG. 3), as the case may be, but that is not necessary in all instances as they can be radially spaced therefrom.

FIGS. 4A-10 show corrugated surface(s) 230, 250, 266, 270 as sinusoidal with identical rounded ridges and grooves of equal amplitude (height) and wavelength λ, (FIG. 4B) between a root (platform end 122 (FIG. 3)) and a tip (shroud end 126 (FIG. 3)) of blade 200. It is emphasized that corrugated surfaces 230, 250, 266, 270 may take a variety of alternative forms. For example, corrugated surface(s) may be: sinusoidal and have rounded ridges and grooves of different wavelength λ, and/or amplitude (FIG. 12); sinusoidal and have rounded ridges and grooves of equal wavelength λ, but inconsistent amplitude (FIG. 13) (even to a point, as shown, of being discontinuous between a root (platform end 122 (FIG. 3)) and a tip (shroud end 126 (FIG. 3) of blade 200); sinusoidal and have rounded ridges and grooves of equal amplitude, but inconsistent wavelengths λ, (FIG. 13); and with different shape corrugations (FIG. 14). The amplitude, wavelength λ, layout and/or waveforms may change in any way required to attain the desired wake mixing. While various embodiments of corrugated surface(s) have been described herein, it is emphasized that a large variety of alternatives are also possible and that any can be combined in any fashion. Further, corrugated surface(s) can be varied in a number of ways including but not limited to: amplitude, wavelength, angle of approach (relative to the rotor), angle of exiting (relative to the rotor), curvature (relative to the rotor), waveform shape, length extending forward from the trailing edge, one side or both sides of the airfoil body on which provided, radial extent upon which provided (some or all, continuous or discontinuous), etc.

Figure 15:
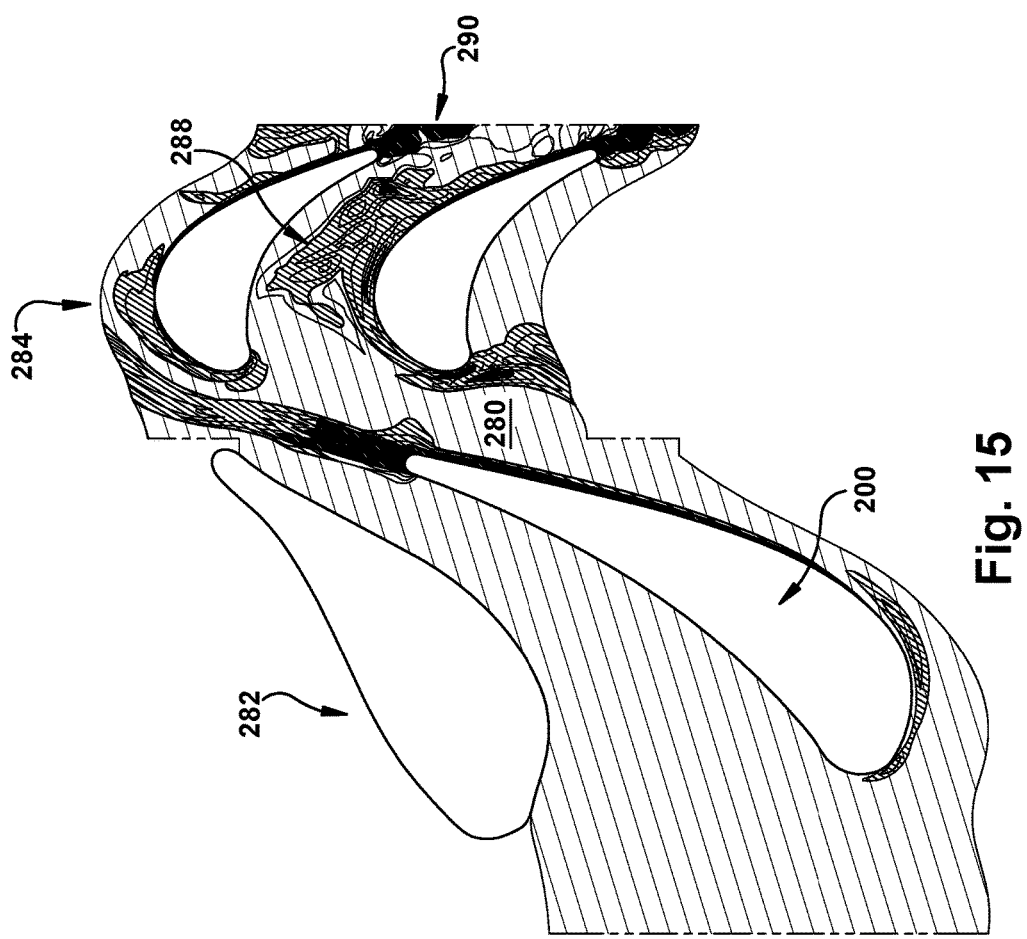
FIG. 15 shows a schematic view of an aerodynamic flow within a turbomachine using a blade according to embodiments of the disclosure.

FIG. 15 shows a schematic view of an aerodynamic flow within a turbomachine using a blade 200 according to embodiments of the disclosure. In operation, embodiments of the disclosed blade 200 act to enhance the mixing of an airfoil wake in a constant area region 280 between airfoil rows 282, 284, through the introduction of discrete vortex structures created by corrugated surface 230 and/or crenulated trailing edge 240. The goal of corrugated surface 230 and crenulated trailing edge 240 is to minimize the velocity deficit before the wake enters downstream blade row 284, which reduces the generation of mixing loss within downstream blade row 284: compare location 288 in FIG. 15 with location 20 in FIG. 1, and location 290 in FIG. 15 with location 22 in FIG. 1. Moving the mixing loss from within downstream blade row 284 to constant area gap region 280 ahead of downstream blade row 284 thus produces a net gain in efficiency. Blade 200 provides this functionality without having to reduce the strength of the wake (e.g., by reducing the diameter of the trailing edge), which is impractical due to mechanical and thermal concerns. Blade 200 also does not require increasing the space for the wake to mix before entering downstream blade row 284, which may result in a higher net loss due to friction losses associated with the longer inner and outer walls of the flowpath and creates a longer turbomachine, which increases cost and lowers power density. Blade 200 also removes the need for complex air jets to create the mixing.

In addition, to the above-described functionality, blade 200 also provides a unitary, internal impingement cooling structure 260. Blade 200 has an inner surface 222 matching the geometry of outer surface 222. Inner surface 222 is cooled with a unitary impingement cooling structure 260 having an outer corrugated surface 266 matching corrugated inner surface 250 such that consistent impingement spacing is maintained over the entire inner airfoil surface being cooled. Depending on desired aerodynamic requirements, blade 200 may be profiled in a wide variety of ways as described herein. For example, across outer surface 220 of the entire concave pressure side outer wall 204, convex suction side outer wall 206, along crenulated trailing edge 240 and/or all the way to leading edge 208. Inner and outer endwalls (platforms 114, 116, 122 or tip 124) can be unitary with airfoil body 202 or separately manufactured and welded to airfoil body 202.

Blade 200 may include any metal or metal compound capable of withstanding the environment in which used. Blade 200 can be advantageously made using additive manufacturing. In this regard, each surface and, in particular, corrugated surface(s) 230, 250, 266, 270 may include surfaces extending at no greater than 45° relative to horizontal. That is, none of the ridges or grooves of corrugate surface(s) 230, 250, 266, 270 or edges of crenulated trailing edge 240 extend at greater than 45° relative to horizontal. It is through additive manufacturing that airfoil body 202 and impingement cooling structure 260 can be formed including a plurality of integral material layers. The plurality of integral material layers may also include the plurality of internal supports 272, 272TE.

As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM has been found advantageous.

Figure 16:
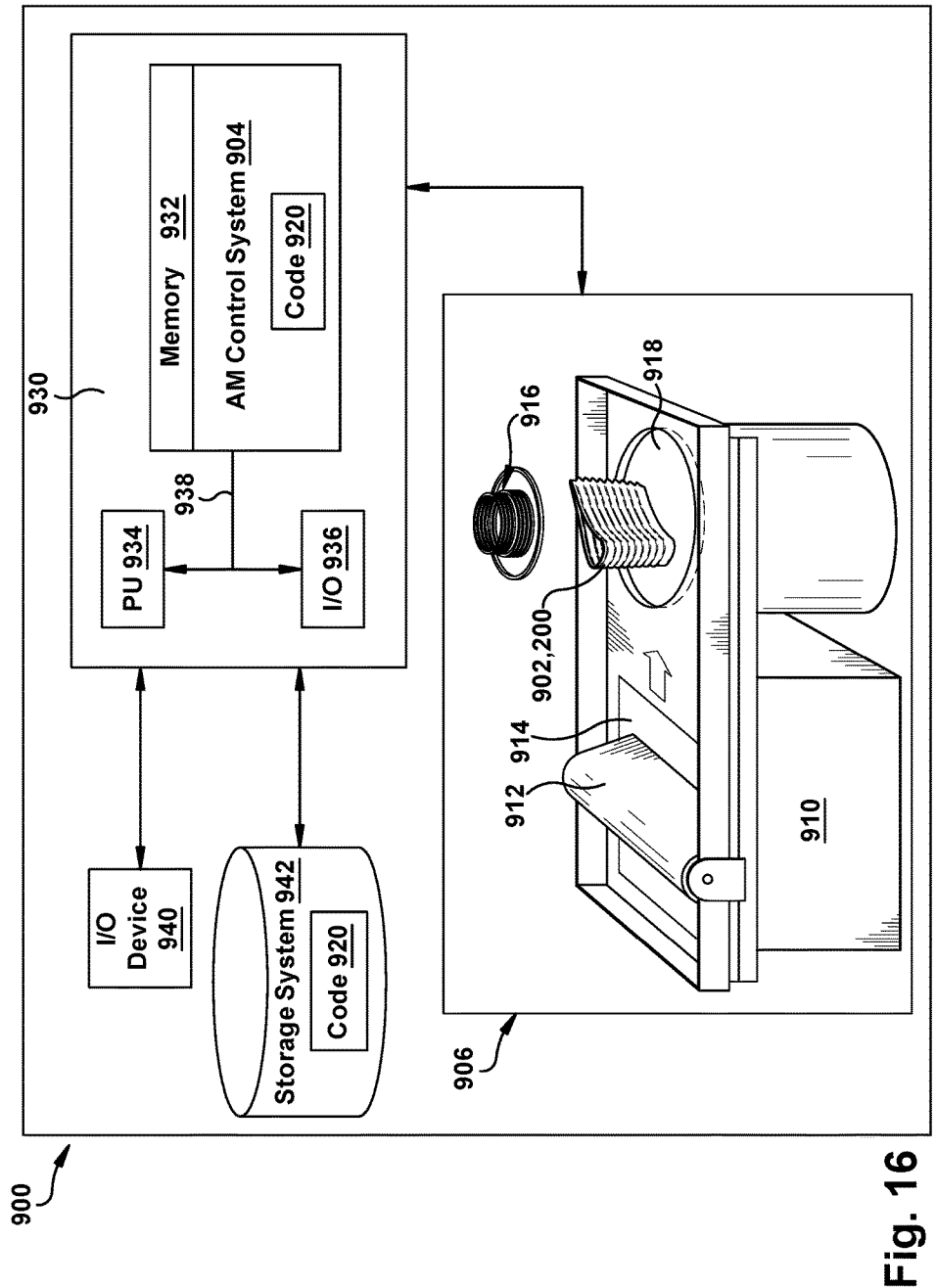
FIG. 16 shows a schematic view of an additive manufacturing process including a non-transitory computer readable storage medium storing code representative of a blade according to embodiments of the disclosure.

To illustrate an example of an additive manufacturing process, FIG. 16 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as blade 200 as described herein. AM system 900 generally includes a computerized additive manufacturing (AM) control system 904 and an AM printer 906. AM system 900, as will be described, executes code 920 that includes a set of computer-executable instructions defining blade 200 to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, blade 200 may be made of a metal or a metal compound. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer or where a metal binder jetting process is used. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer. AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of blade 200, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, touchscreen, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile smartphone, a personal data assistant, etc.

Additive manufacturing processes begin with a non-transitory computer readable storage medium (e.g., memory 932, storage system 942, etc.) storing code 920 representative of blade 200. As noted, code 920 includes a set of computer-executable instructions defining blade 200 that can be used to physically generate, among other things, corrugated surface(s), upon execution of the code by system 900. For example, code 920 may include a precisely defined 3D model of blade 200 and can be generated from any of a large variety of well known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing blade 200 into a series of thin slices that it assembles using AM printer 906 in successive layers of liquid, powder, sheet or other material. In the DMLM example, each layer is melted to the exact geometry defined by code 920 and fused to the preceding layer. Subsequently, blade 200 may be exposed to any variety of finishing processes, e.g., minor machining, sealing, polishing, assembly to other part of the blade, etc.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A blade comprising:
   an airfoil body defined by a concave pressure side outer wall and a convex suction side outer wall that connect along leading and trailing edges and, therebetween, form a radially extending chamber for receiving a flow of a coolant, the airfoil body having an outer surface and an inner surface facing the radially extending chamber;

a first radially extending corrugated surface on a portion of the outer surface;

a second corrugated surface on the inner surface paralleling the first corrugated surface; and an impingement cooling structure formed integral with the airfoil body and positioned within the radially extending chamber, the impingement cooling structure including a portion of an outer surface thereof having a third corrugated surface paralleling the second corrugated surface on the inner surface of the airfoil body, wherein a spacing-distance between the third corrugated surface of the impingement cooling structure and the second corrugated surface on the inner surface of the airfoil body is fixed.

2. The blade of claim 1, further comprising a plurality of internal supports positioning the impingement cooling structure relative to the radially extending chamber, and wherein the airfoil body and the impingement cooling structure include a plurality of integral material layers that also include the plurality of internal supports.

3. The blade of claim 2, further comprising a passage extending from an inside of the impingement cooling structure through at least one of the plurality of internal supports and the airfoil body to an outer surface of the airfoil body.

4. The blade of claim 3, wherein the at least one of the plurality of internal supports couples the trailing edge of the airfoil body to the impingement cooling structure.

5. The blade of claim 1, wherein the portion of the outer surface of the airfoil body extends along at least one of the concave pressure side outer wall and the convex suction side outer wall from the trailing edge to the leading edge.

6. The blade of claim 1, wherein the portion of the outer surface of the airfoil body includes a first section that extends only partially along at least one of the concave pressure side outer wall and the convex suction side outer wall from the trailing edge towards the leading edge.

7. The blade of claim 6, wherein the portion of the outer surface of the airfoil body further includes a second section extending from the leading edge partially towards the trailing edge, and a third section, radially spaced from the second section, extending from the leading edge partially towards the trailing edge.

8. The blade of claim 1, wherein the portion of the outer surface of the airfoil body includes the trailing edge.

9. The blade of claim 1, wherein each corrugated surface includes surfaces extending at no greater than 45° relative to horizontal.

10. The blade of claim 1, wherein the airfoil body and the impingement cooling structure include a plurality of integral material layers.

11. A blade comprising:

an airfoil body defined by a concave pressure side outer wall and a convex suction side outer wall that connect along a leading edge and a crenulated trailing edge and, therebetween, form a radially extending chamber, the airfoil body having an inner surface facing the radially extending chamber and an outer surface;

an impingement cooling structure positioned within the radially extending chamber, the impingement cooling structure integrally formed with the airfoil body and including:

a corrugated outer surface positioned adjacent and paralleling a corrugated portion of the inner surface of the crenulated trailing edge of the airfoil body.

12. The blade of claim 11, wherein the airfoil body and the impingement cooling structure include a plurality of integral material layers.

13. The blade of claim 12, further comprising a plurality of internal supports positioning the impingement cooling structure relative to the radially extending chamber, and wherein the plurality of integral material layers also include the plurality of internal supports.

14. The blade of claim 13, further comprising a passage extending from an inside of the impingement cooling structure through at least one of the plurality of internal supports and the airfoil body to the outer surface of the airfoil body.

15. The blade of claim 11, further comprising:

a first corrugated surface on a portion of the outer surface of the airfoil body; and a second corrugated surface on the inner surface of the airfoil body paralleling the first corrugated surface.

16. The blade of claim 15, wherein the portion of the outer surface of the airfoil body extends along at least one of the concave pressure side outer wall and the convex suction side outer wall from the trailing edge to the leading edge.

17. The blade of claim 15, wherein the portion of the outer surface of the airfoil body includes a first section that extends only partially along at least one of the concave pressure side outer wall and the convex suction side outer wall from the trailing edge towards the leading edge.

18. The blade of claim 17, wherein the portion of the outer surface of the airfoil body further includes a second section extending from the leading edge partially towards the trailing edge, and a third section, radially spaced from the second section, extending from the leading edge partially towards the trailing edge.

19. A non-transitory computer readable storage medium storing code representative of a blade, the blade physically generated upon execution of the code by a computerized additive manufacturing system, the code comprising:

code representing the blade, the blade including:

an airfoil body defined by a concave pressure side outer wall and a convex suction side outer wall that connect along leading and trailing edges and, therebetween, form a radially extending chamber, the airfoil body having an inner surface facing the radially extending chamber and an outer surface;

a first radially extending corrugated surface on a portion of the outer surface;

a second corrugated surface on the inner surface paralleling the first corrugated surface; and an impingement cooling structure formed integral with the airfoil body and positioned within the radially extending chamber, the impingement cooling structure including a portion of an outer surface thereof having a third corrugated surface paralleling the second corrugated surface on the inner surface of the airfoil body, wherein a spacing-distance between the third corrugated surface of the impingement cooling structure and the second corrugated surface on the inner surface of the airfoil body is fixed.

20. The storage medium of claim 19, further comprising a plurality of internal supports positioning the impingement cooling structure relative to the radially extending chamber.

* * * * *